United States Patent [19]

Etsion et al.

[11] 4,291,887
[45] Sep. 29, 1981

[54] MODIFIED FACE SEAL FOR POSITIVE FILM STIFFNESS

[76] Inventors: Robert A. Frosch, Administrator of the National Aeronautics and Space Administration, with respect to an invention of Izhak Etsion, Haifa, Israel; Abraham Lipshitz, University Heights, Ohio

[21] Appl. No.: 92,145

[22] Filed: Nov. 7, 1979

[51] Int. Cl.³ .......................... F16J 15/34; F16J 15/40
[52] U.S. Cl. ........................................ 277/27; 277/40; 277/93 R
[58] Field of Search .................... 277/40, 41, 65, 59, 277/84, 85, 93 R, 93 SD, 81 R, 27

[56] References Cited

U.S. PATENT DOCUMENTS

| | | |
|---|---|---|
| 2,444,714 | 7/1948 | Voytech .............................. 277/40 |
| 3,462,159 | 8/1969 | Baumann et al. ..................... 277/27 |
| 3,536,333 | 10/1970 | Gits et al. ......................... 277/40 X |
| 3,749,412 | 7/1973 | Lingley ............................ 277/81 R |
| 4,026,564 | 5/1977 | Metcalfe ........................... 277/96.1 |

FOREIGN PATENT DOCUMENTS

| | | |
|---|---|---|
| 2144172 | 3/1973 | Fed. Rep. of Germany .... 277/93 R |
| 462187 | 3/1937 | United Kingdom ............. 277/81 R |
| 891419 | 3/1962 | United Kingdom .................. 277/27 |

Primary Examiner—Robert S. Ward, Jr.
Attorney, Agent, or Firm—N. T. Musial; J. R. Manning; Gene E. Shook

[57] ABSTRACT

The object of the invention is to improve the film stiffness of a face seal without increasing the sealing and dam area.

The improved sealing apparatus (16) has a primary seal ring (20) in the form of a nose piece. A spring (24) forces a sealing surface (28) on the seal ring into sealing contact with a seat (18) to form a face seal. A circumferential clearance seal is formed in series with this face seal by a lip (34) on the nose piece. The width of the surface (36) of the lip is substantially the same as the width of the sealing surface (28) on the face seal. Also the clearance between the surface (36) on the lip and the shaft (10) is substantially the same as the spacing between the face sealing surfaces (28 and 30) on the face seal when the shaft is rotating.

The circumferential clearance seal restricts the flow of fluid from a main cavity (14) to an intermediate cavity (32) with a resulting pressure drop. The hydrostatic opening face is strongly dependent on the face seal clearance, and the desired axial stiffness is achieved.

4 Claims, 1 Drawing Figure

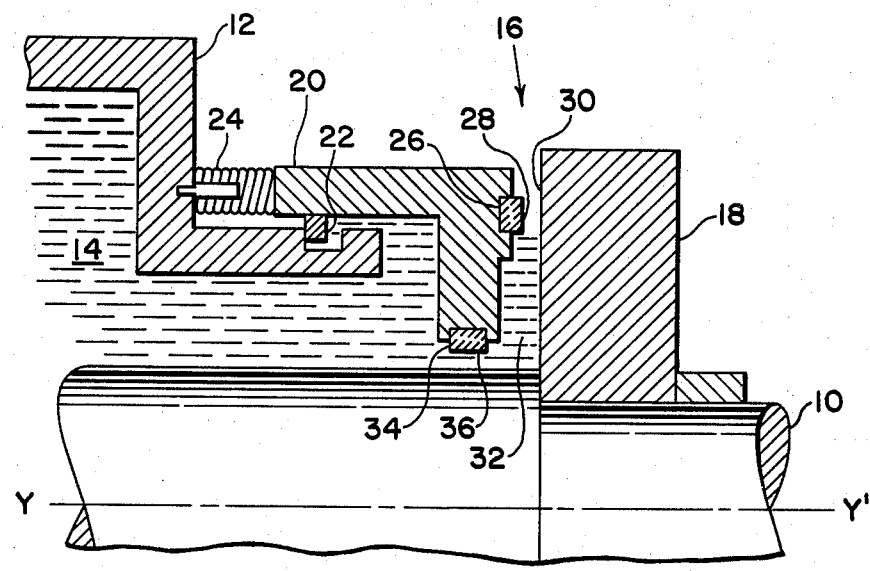

MODIFIED FACE SEAL FOR POSITIVE FILM STIFFNESS

DESCRIPTION

Origin of the Invention

The invention described herein was made in the performance of work under a NASA contract and is subject to the provisions of Section 305 of the National Aeronautics and Space Act of 1958, Public Law 85-568 (72 Statute 435; 42 U.S.C. 2457).

Technical Field

The present invention relates generally to face type seals, and more particularly to improving film stiffness without increasing the sealing and dam area. The primary objective of face type seals is to reduce the leakage and friction losses to a minimum. However, these two requirements contradict each other.

It is extremely important to maintain a small clearance as close as possible to the design value or a seal failure may occur. Hence, an axial film stiffness is vital to the proper seal operation. One way of introducing axial stiffness to a face seal is by angular misalignment, but this also increases leakage and may initiate dynamic instability. Thus, parallel face operation is another desired condition in a seal. Unfortunately, face seals of the type used in the prior art have no axial film stiffness when they operate with the parallel faces unless such stiffness is introduced by means such as grooves or steps which require large face areas that increase friction.

Background Art

A mechanical contact between the seal faces such as shown in U.S. Pat. No. 2,250,348 eliminates leakage but produces high friction losses. A seal of the type shown in U.S. Pat. No. 4,026,564 which relied on large clearance to reduce the friction produces an increase in the leakage. Non-contacting face seals of the type shown in U.S. Pat. No. 3,751,045 proposes to solve this problem by a non-contacting face seal in which the clearance between the mating faces is just sufficient to avoid any rubbing contact at the expense of some leakage through a secondary seal.

Several procedures have been suggested to produce axial stiffness in radial face seal. These include various stepped and grooved configurations of the type shown in U.S. Pat. No. 3,804,424. A major disadvantage of such methods is the need for large face areas to accommodate the various steps or grooves. Large areas increase frictional losses.

DISCLOSURE OF THE INVENTION

Seal performance in terms of leakage and friction losses is optimized with an improved sealing apparatus comprising a circumferential clearance seal combined in series with a face seal. With such an arrangement, the hydrostatic opening force is dependent on the face seal clearance and axial stiffness is achieved.

BRIEF DESCRIPTION OF THE DRAWING

The advantages and novel features of the invention will be more fully apparent from the following detailed description when read in connection with the accompanying drawing which is an axial quarter section of a seal constructed in accordance with the present invention showing the relative position of the various parts when the shaft is rotating.

BEST MODE FOR CARRYING OUT THE INVENTION

Referring now to the drawing, a shaft 10 extends into a container 12 of liquid in a main cavity 14. The shaft 10 is rotated about its normal axis Y-Y' and may be used to transmit torque from a motor to a pump. The liquid in the cavity 14 is at a pressure that is higher than the pressure outside the container 12. Loss of liquid 14 from the container 12 is prevented by a seal 16 constructed in accordance with the present invention.

The seal 16 incorporates a rotatable seat 18 in the form of a shoulder on the shaft 10. The seal 16 further includes a primary seal ring 20 in the form of a nose piece through which the shaft 10 extends. The nose piece is flexibly mounted on the container 12.

A secondary seal 22, such as a piston ring or elastomeric "O" ring, is interposed between the ring 20 and the container 12. The seal 22 prevents leakage of the liquid in the main cavity 14 between the primary seal ring 20 and the container 12.

A spring 24 biases the ring 20 toward the rotatable seat 18. Rotation of the ring 20 is prevented by conventional antirotation means.

The ring 20 has a circular insert 26 of a wear resistant material, such as carbon, with a radially extending surface 28. The seat 18 has a mating surface 30. The surfaces 28 and 30 are maintained in sealing engagement by the biasing action of the spring 24 and by fluid pressure when the shaft 10 is stationary. The dam formed by the sealing engagement of the surfaces 28 and 30 prevents leakage of the liquid 14 from an intermediate cavity 32 between the ring 20 and the seat 18 adjacent to the shaft 10. The engagement of the surfaces 28 and 30 form a face seal, and these surfaces are preferably optically flat.

In accordance with the present invention a lip formed by a tubular insert 34 in the ring 20 extends circumferentially around the shaft 10. The lip has a surface 36 spaced from the shaft 10 to form a circumferential clearance seal. Thus, the seal 16 comprises a face seal having a circumferential clearance seal combined in series with it.

By this arrangement the fluid pressure in the intermediate cavity 32 is lower than that in the main cavity 14. The hydrostatic opening force becomes strongly dependent on the face seal clearance between the surfaces 28 and 30, and the desired axial stiffness is achieved. The circumferential clearance seal acts in the same manner as an external restriction in a hydrostatic thrust bearing. The effect of the film stiffness is similar to an orifice compensated seal, but the added friction torque can be reduced substantially.

It is important that the width of the surface 36 on the insert 34 measured axially along the shaft 10 is substantially the same as the width of the surface 28 on the insert 26 measured radially outward from the shaft 10. Also, the spacing of the circumferential clearance seal between the surface 36 and the shaft 10 is substantially the same as the clearance between the surfaces 28 and 30 of the face seal when the shaft 10 is rotating for optimum performance.

While the preferred embodiment of the invention is disclosed and described it will be appreciated that various modifications may be made to the disclosed seal structure without departing from the spirit of the invention or the scope of the subjoined claims.

We claim:

1. In apparatus for sealing a rotatable shaft extending into a container of fluid of the type having a seat member mounted on said shaft for rotation therewith and an annular seal ring member extending around said shaft in spaced relationship thereto for reciprocating movement toward and away from said seat along the axis of rotation of said shaft with means for biasing said ring member into engagement with said seat wherein said ring member has a substantially circular face directed toward said seat and a substantially cylindrical face spaced from said shaft, the improvement comprising a circular member rigidly mounted on said ring member in said circular face and having a planar surface extending therefrom toward said seat for sealing engagement therewith by action of said biassing means when said shaft is stationary thereby forming a face seal, said planar surface being moved out of engagement with said seat by a hydrostatic opening force when said shaft is rotating resulting from a flow of said fluid between said shaft and said cylindrical face to said seat, and a tubular member rigidly mounted on said ring member in said cylindrical face and having a curved surface extending therefrom toward said shaft to form a circumferential clearance seal in series with said face seal to restrict said flow of said fluid to said seat thereby controlling said hydrostatic opening force, the radial width of said planar surface on said circular member being substantially equal to the axial width of said curved surface on said tubular member to provide a predetermined axial stiffness of said face seal so that the spacing between said planar surface and said seat when said shaft is rotating is substantially the same as the spacing between said curved surface and said shaft.

2. In apparatus as claimed in claim 1 wherein the biasing means comprises a spring.

3. In apparatus as claimed in claim 1 wherein the circular member is of a wear-resistant material.

4. In apparatus as claimed in claim 3 wherein the wear-resistant circular member is carbon.

* * * * *